United States Patent [19]

Yoshii et al.

[11] 4,280,331
[45] Jul. 28, 1981

[54] SINGLE EFFECT AND DOUBLE EFFECT ABSORPTION REFRIGERATING SYSTEM

[75] Inventors: Kazuhiro Yoshii; Norikazu Kubota, both of Gunma, Japan

[73] Assignees: Sanyo Electric Co., Ltd.; Tokyo Sanyo Electric Co., Ltd., both of Osaka, Japan

[21] Appl. No.: 90,751

[22] Filed: Nov. 2, 1979

[30] Foreign Application Priority Data

Nov. 7, 1978 [JP] Japan .................. 53-138103

[51] Int. Cl.³ ............... F25B 15/00; F25B 27/00
[52] U.S. Cl. .................... 62/148; 62/476; 62/2
[58] Field of Search .......... 62/2, 148, 476, 489, 62/497

[56] References Cited

U.S. PATENT DOCUMENTS

| | | | |
|---|---|---|---|
| 3,590,593 | 7/1971 | Miner | 62/148 |
| 3,605,432 | 9/1971 | Wada | 62/476 X |
| 3,710,852 | 1/1973 | Porter | 62/476 X |
| 3,837,174 | 9/1974 | Miyagi et al. | 62/148 X |
| 4,028,078 | 6/1977 | Peckham | 62/2 X |
| 4,085,595 | 4/1978 | Saito et al. | 62/476 |
| 4,179,895 | 12/1979 | Shimokawa et al. | 62/2 |
| 4,183,228 | 1/1980 | Saito et al. | 62/476 X |

Primary Examiner—Lloyd L. King
Attorney, Agent, or Firm—Darby & Darby

[57] ABSTRACT

This application discloses a single effect and double effect absorption refrigerating system, in which water is used as a refrigerant and LiBr as an absorbent, for example. A refrigerating cycle is formed by connecting in an air-tight manner a high temperature generator to be heated by a high temperature heat source, a first low temperature generator to be heated by refrigerant vapor separated from a dilute solution in said high temperature generator, a condenser, an evaporator, an absorber, a first heat exchanger and a second heat exchanger by means of refrigerant lines, dilute solution lines and dense solution lines. A second low temperature generator to be heated by a low temperature heat source is disposed between one of the dilute solution lines and one of the dense solution lines so as to communicate with said condenser, whereby the supply of a solution and a fuel to said high temperature generator may be controlled dependent on the heating capacity of said second low temperature generator. Dependent on the low temperature heat source and loads, the operation mode of the absorption refrigerating system may selectively be switched to either a single effect operation, or a double effect operation, or a single effect-double effect combined operation, thereby to realize the effective use of energy and a stable switching operation.

9 Claims, 4 Drawing Figures

SINGLE EFFECT AND DOUBLE EFFECT ABSORPTION REFRIGERATING SYSTEM

BACKGROUND OF THE INVENTION

In a single effect absorption refrigerating system utilizing warm water obtained by a solar heat collecting apparatus, only a single effect operation can be performed and it is not possible to perform a double effect operation even though a heat source of high temperature such as vapor is available.

On the other hand, in a double effect absorption refrigerating system, the procedure of switching a double effect operation to a single effect operation is very complicated and it is not possible to perform a single effect-double effect combined operation. Accordingly, when a low temperature heat source for a single effect operation is not sufficiently provided, such single effect operation has to be stopped and only a double effect operation by a high temperature heat source must be performed. Thus, the low temperature heat source being not utilized, only a high temperature heat source is used and it is therefore not possible to efficiently utilize energy.

OBJECTS OF THE INVENTION

It is an object of the present invention to provide a single effect and double effect absorption refrigerating system in which, when a low temperature heat source such as waste heat or hot water obtained by a solar heat collecting apparatus is sufficiently provided, a single effect operation is performed; and when the low temperature heat source above-mentioned is not sufficiently provided, a double effect operation by a high temperature heat source such as town gas, kerosene or high temperature vapor is automatically performed, so that a single effect-double effect combined operation is performed; and when it is not possible to perform a single effect operation with the low temperature heat source, only a double effect operation can be performed with a single effect operation stopped, whereby, dependent on the low temperature heat source and loads, the operation mode of the absorption refrigerating system may be selected, thereby to realize the effective use of energy and a stable switching operation.

DETAILED DESCRIPTION OF THE PREFERRED EMBODIMENTS

The description will first be made of a first embodiment of the present invention with reference to FIG. 1.

Figure 1:
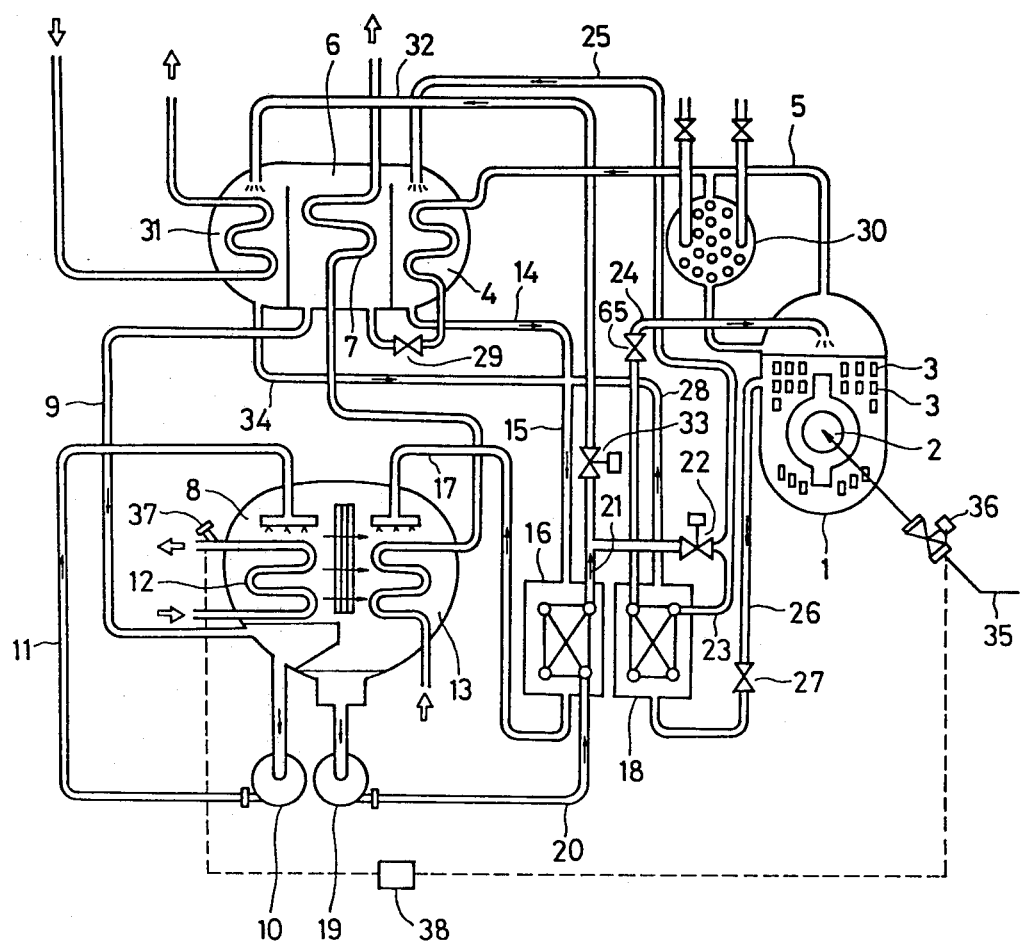
FIGS. 1 to 4 are views illustrating embodiments of a single effect and double effect absorption refrigerating system in accordance with the present invention.

In FIG. 1, a direct fired high temperature generator 1 has a combustion heating chamber 2 for a high temperature heat source such as town gas or kerosene and the heating pipes 3 of the heating chamber 2. This direct fired high temperature generator 1 is adapted to heat a dilute solution to separate a refrigerant therefrom. A first low temperature generator 4 is disposed for heating a dilute solution to separate a refrigerant therefrom with the refrigerant vapor supplied from the high temperature generator 1 through a refrigerant vapor line 5.

A condenser 6 is disposed for condensing and cooling, by cooling means 7, the refrigerants supplied from the high temperature generator 1 and the first low temperature generator 4. A refrigerant liquid from the condenser 6 is transferred to and sprayed in an evaporator 8 through a refrigerant downstream line 9, a refrigerant pump 10 and a refrigerant circulation line 11. By utilizing latent heat produced when this refrigerant liquid is evaporated, cooled water for air-cooling may then be obtained from water cooling means 12.

A dense solution formed with a refrigerant separated from a dilute solution in the high temperature generator 1 is supplied to a dense solution line 15 through a dense solution line 26, a cutoff valve 27, a second heat exchanger 18 and a dense solution line 28. A dense solution formed with a refrigerant separated from a dilute solution in the first low temperature generator 4 is also supplied, through a dense solution line 14, to the dense solution line 15 where this dense solution from the first low temperature generator 4 joins the dense solution supplied from the high temperature generator 1. Thus joined dense solution is transferred to the absorber 13 through a first heat exchanger 16 and a dense solution line 17. In the absorber 13, the dense solution is sprayed to absorb refrigerant vapor therein. Thus, the inside of the evaporator 8 is maintained at a low temperature, thereby to provide a continuous supply of cooled water from the water cooling means 12 in the evaporator 8.

A dilute solution in the absorber 13 is transferred to and sprayed in the high temperature generator 1 through an absorbent solution pump 19, a dilute solution line 20, the first heat exchanger 16, a dilute solution line 21, a control valve 22, a dilute solution line 23, a second heat exchanger 18, cutoff valve 65 and a dilute solution line 24.

A dilute solution line 25 is branched from the dilute solution line 23, and a dilute solution passed through the control valve 22 is sprayed in the first low temperature generator 4, from the end of this dilute solution line 25.

A dense solution line 26 is disposed for supplying a dense solution from the high temperature generator 1 to the second heat exchanger 18, and is provided with a cutoff valve 27. A dense solution supplied to the second heat exchanger 18 is transferred to the dense solution line 15 through a dense solution line 28.

A cutoff valve 29 is disposed between the bottom of the condenser 6 at the end of the refrigerant vapor line 5. With such arrangement, a double effect absorption refrigerating cycle is constituted.

A heat exchanger 30 is connected to the high temperature generator 1 and the refrigerant vapor line 5.

A second low temperature generator 31 is disposed adjacent to the condenser 6 at the position opposite to the first low temperature generator 4 and is adapted to be heated by a low temperature heat source such as hot water obtained from a solar heat collecting apparatus.

A dilute solution line 32 is branched from the dilute solution line 21 and the end of the dilute solution line 32 is opened in the upper portion of the second low temperature generator 31.

A control valve 33 is disposed at the dilute solution line 32. A dense solution in the second low temperature generator 31 is transferred to the dense solution line 15 through a dense solution line 34.

A fuel supply line 35 for the high temperature generator 1 is provided with a fuel control valve 36. A temperature detector 37 is disposed for detecting the temperature of the cooled water from the water cooling means 12, and a temperature controller 38 is adapted to be operated by this temperature detector 37. The aperture of the fuel control valve 36 is adapted to be controlled by this temperature controller 38.

The description will then be made of the operations of the first embodiment of the present invention shown in FIG. 1.

(A) Single Effect Operation

When a low temperature heat source is sufficiently provided, a single effect operation is performed. In such a case, with the fuel control valve 36 and the control valve 22 closed and the control valve 33 opened, the second low temperature generator 31 is heated by a lower temperature heat source. A dilute solution from the absorber 13 is transferred to and sprayed in the second low temperature generator 31 through the absorbent solution pump 19, the dilute solution line 20, the first heat exchanger 16, the dilute solution line 21, the control valve 33 and the dilute solution line 32, and the refrigerant is separated from this dilute solution. The refrigerant is then liquidized in the condenser 6, and subsequently transferred to and sprayed in the evaporator 8 through the refrigerant downstream line 9, the refrigerant pump 10 and the refrigerant circulation line 11. Thus sprayed refrigerant is then evaporated in the evaporator 8. By evaporation latent heat at the time of this evaporation, cooled water for air cooling may be obtained from the water cooling means 12.

On the other hand, the dense solution formed with the refrigerant separated from the dilute solution in the second low temperature generator 31, is transferred to and sprayed in the absorber 13 through the dense solution lines 34 and 15, the first heat exchanger 16 and the dense solution line 17, and subsequently absorbs the evaporated refrigerant, and is changed into a dilute solution. Thereafter, such cycle is repeated.

(B) Double Effect Operation

When a single effect operation may not be performed because the temperature of the low temperature heat source is too low, a double effect operation is performed.

With the fuel control valve 36, the control valve 22 and the cutoff valves 27 and 29 opened and the control valve 33 closed, the direct fired high temperature generator 1 is heated by a high temperature heat source. A dilute solution from the absorber 13 is supplied to the high temperature generator 1 through the absorbent solution pump 19, the dilute solution line 20, the first heat exchanger 16, the dilute solution line 21, the control valve 22, the dilute solution line 23, the second heat exchanger 18, cutoff valve 65 and the dilute line 24, and the refrigerant is separated from the dilute solution in the high temperature generator 1. Thus separated refrigerant vapor is supplied to the condenser 6 through the refrigerant vapor line 5 and heats in the first low temperature generator 4 the dilute solution supplied from the control valve 22 through the dilute line 25, so as to separate the refrigerant from this dilute solution. The refrigerant liquidized in the condenser 6 is transferred to and sprayed in the evaporator 8 through the refrigerant downstream line 9, the refrigerant pump 10 and the refrigerant circulation line 11, and is subsequently evaporated in the evaporator 8. By evaporation latent heat at the time of this evaporation, cooled water for air cooling may be obtained from the water cooling means 12.

On the other hand, the dense solution formed with the refrigerant separated from the dilute solution in the high temperature generator 1, is transferred to the dense solution line 15 through the dense solution line 26, the cutoff valve 27, the second heat exchanger 18 and the dense solution line 28. The dense solution formed with the refrigerant separated from the dilute solution in the first low temperature generator 4, is transferred also to the dense solution line 15 through the dense solution line 14, and joins the dense solution transferred from the high temperature generator 1 through the dense solution line 28. Thus joined dense solution is then transferred to and sprayed in the absorber 13 through the first heat exchanger 16 and the dense solution line 17, and absorbs there evaporated refrigerant, and is changed into a dilute solution. Thereafter, such cycle will be repeated.

It is to be understood that, when water is being flowed into the heat exchanger 30, the hot water is obtained by the heat-exchange with the refrigerant vapor.

When the temperature of cooled water supplied from the water cooling means 12 reaches a predetermined level, the temperature detector 37 will actuate the temperature controller 38 to throttle the fuel control valve 36 for controlling the supply of a fuel and the generation of a refrigerant in the high temperature generator 1.

(C) Single Effect and Double Effect Combined Operation

When the high temperature heat source has to supplementarily be supplied since the low temperature heat source is not sufficiently provided, such single effect and double effect combined operation may be performed.

For performing such combined operation, the control valve 33, which is closed for a double effect operation, is opened, and a dilute solution passed through the first heat exchanger 16, is supplied to the high temperature generator 1 and the first low temperature generator 4 through the control valve 22 and is also supplied to the second low temperature generator 31 through the control valve 33 and the dilute solution line 32.

(D) Heating Operation

When intending to obtain hot water for heating, such heating operation is performed.

With the cutoff valve 29 at the refrigerant vapor line 5, the cutoff valve 27 at the dense solution line 26 and the cutoff valve 65, closed, a refrigerant is circulated between the high temperature generator 1 and the heat exchanger 30. Hot water for heating is then supplied from the heat exchanger 30.

As thus discussed hereinbefore, according to the absorption refrigerating system shown in FIG. 1, a refrigerating cycle in the double effect absorption refrigerating system is formed by connecting in an air-tight manner the high temperature generator 1 to be heated by a high temperature heat source, the first low temperature generator 4 to be heated by refrigerant vapor separated from a dilute solution in the high temperature generator 1, the condenser 6, the evaporator 8, the absorber 13, the first heat exchanger 16 and the second heat exchanger 18 through the refrigerant lines, the dilute solution lines and the dense solution lines. In such double effect absorption refrigerant system, the second low temperature generator 31 disposed between the dilute solution line and the dense solution line and adapted to be heated by a low temperature heat source is communicated with the condenser 6, whereby the supply of a solution and a fuel to the high temperature generator 1 may be controlled dependent on the heating capacity of the second low temperature generator 31. A dilute solution passed through the first heat exchanger 16 from the absorber 13, is supplied to the high temperature generator 1 and the first low temperature generator 4 through the control valve 22, and is also supplied to the second low temperature generator 31 through the control valve 33. The dense solutions formed with the refrigerants separated from the dilute solutions in each of the generators 1, 4 and 31 join each other and thus joined solution is then returned to the absorber 13 through the first heat exchanger 16. With such arrangement, dependent on the low temperature heat source and loads, the operation mode of such absorption refrigerating system may be selected to realize the effective use of energy and a stable switching operation.

Figure 2:
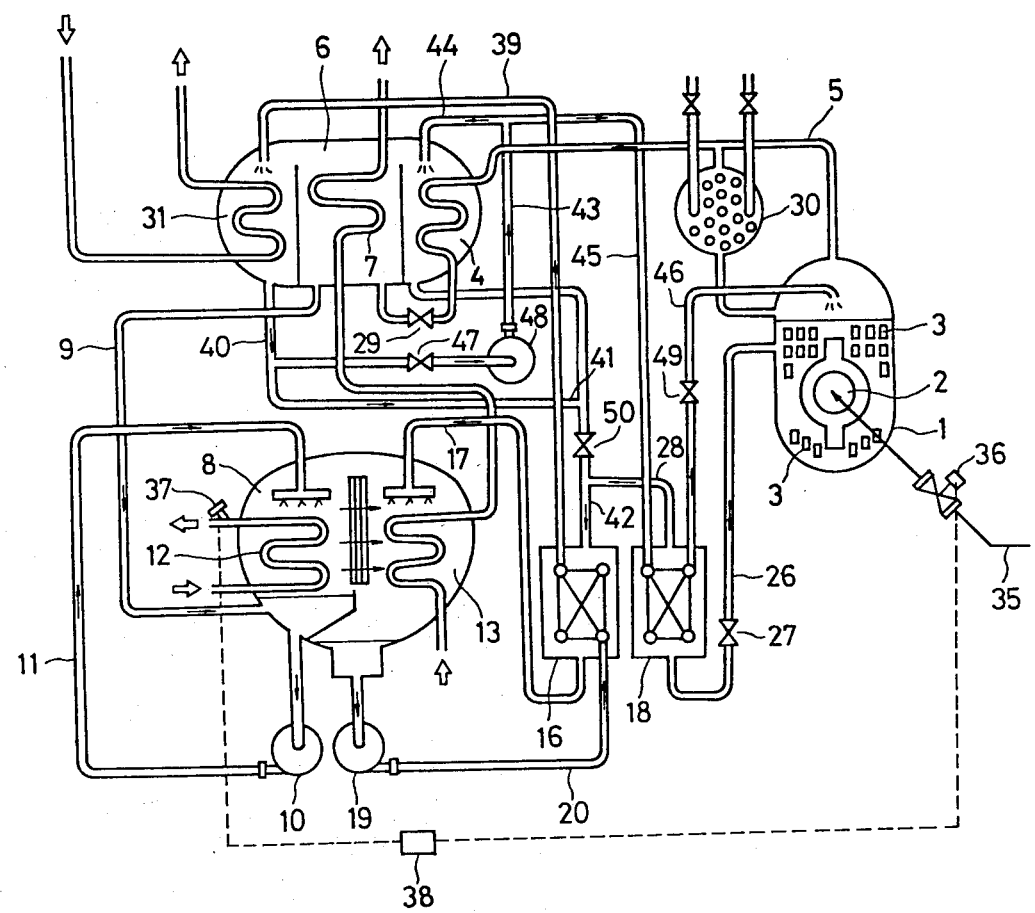

The description will then be made of the second embodiment of the present invention shown in FIG. 2.

In FIG. 2, like parts are designated by the same numerals used in FIG. 1.

A second low temperature generator 31 is disposed at the upstream side with respect to a first low temperature generator 4. A dilute solution from an absorber 13 is supplied directly to the second low temperature generator 31 through an absorbent solution pump 19, a dilute solution line 20, a first heat exchanger 16 and a dilute solution line 39. The bottom of the second low temperature generator 31 is connected to the first heat exchanger 16 through solution lines 40, 41 and 42. A solution in the second low temperature generator 31 is returned to the absorber 13 from the first heat exchanger 16 through a dense solution line 17. A solution in the second low temperature generator 31 is supplied to the first low temperature generator 4 through solution lines 43 and 44 branched from the solution line 40, and is also supplied to the high temperature generator 1 through a solution line 45 branched from the solution line 43, a second heat exchanger 18 and a solution line 46.

A cutoff valve 47 and a solution pump 48 are disposed at the solution line 43, and a cutoff valve 49 is disposed at the solution line 46, and a cutoff valve 50 is disposed at the solution line 41.

A dense solution in the high temperature generator 1 joins the solution in the solution line 42, through a dense solution line 26, a cutoff valve 27, a second heat exchanger 18 and a dense solution line 28.

The operations of the second embodiment of the present invention shown in FIG. 2 will then be discussed.

(A) Single Effect Operation

When intending to perform a single effect operation, a solution pump 48 is stopped operating with the cutoff valve 47 closed and the cutoff valve 50 opened. When the second low temperature generator 31 is heated by the low temperature heat source, an absorption refrigerating cycle is formed by a circuit constituted by the second low temperature generator 31, a condenser 6, a refrigerant downstream line 9, a refrigerant pump 10, a refrigerant circulation line 11 and an evaporator 8, and a circuit constituted by the absorber 13, the absorbent solution pump 19, a dilute solution line 20, the first heat exchanger 16, the dilute solution line 39, the second low temperature generator 31, the solution lines 40 and 41, the cutoff valve 50, the solution line 42, the first heat exchanger 16 and the dense solution line 17. With such arrangement, cooled water for air-cooling may be obtained from the water cooling means 12, likely in the case of the single effect operation of the system in FIG. 1.

(B) Single Effect and Double Effect Combined Operation

When intending to perform a single effect and double effect combined operation, the solution pump 48 is operated with the cutoff valve 47 opened and the cutoff valve 50 closed.

When the high temperature generator 1 is heated by the high temperature heat source, the single effect operation mentioned earlier is performed. At the same time, the solution in the second low temperature generator 31 is supplied to the first low temperature generator 4 through the solution line 40, the cutoff valve 47, the solution pump 48 and the solution lines 43 and 44, and is also supplied to the high temperature generator 1 from the solution line 43 through a solution line 45, the second heat exchanger 18, the cutoff valve 49 and a solution line 46. With such arrangement, a single effect and double effect combined absorption refrigerating cycle is formed, whereby cooled water for air-cooling may be obtained from the water cooling means 12 and hot water may be provided from the heat exchanger 30.

When intending to obtain hot water for heating by means of hot water, the cutoff valves 29 and 49 and 27 disposed at a refrigerant vapor line 5, the solution line 46 and the dense solution line 26, respectively, are closed and a refrigerant is circulated between the high temperature generator 1 and a heat exchanger 30.

As thus described hereinbefore, according to the absorption refrigerating system shown in FIG. 2, the second low temperature generator 31 is disposed at the upstream side with respect to the first low temperature generator 4, and the bottom of the second low temperature generator 31 is connected to the first low temperature generator 4 and the high temperature generator 1 through the cutoff valve 47 and the solution pump 48, and the bottom of the second low temperature generator 31 is also connected to the absorber 13 through the cutoff valve 50. With such arrangement, dependent on the low temperature heat source and loads, the operation mode may be selected by operation of each of the cutoff valves 47 and 50 and the solution pump 48.

Figure 3:
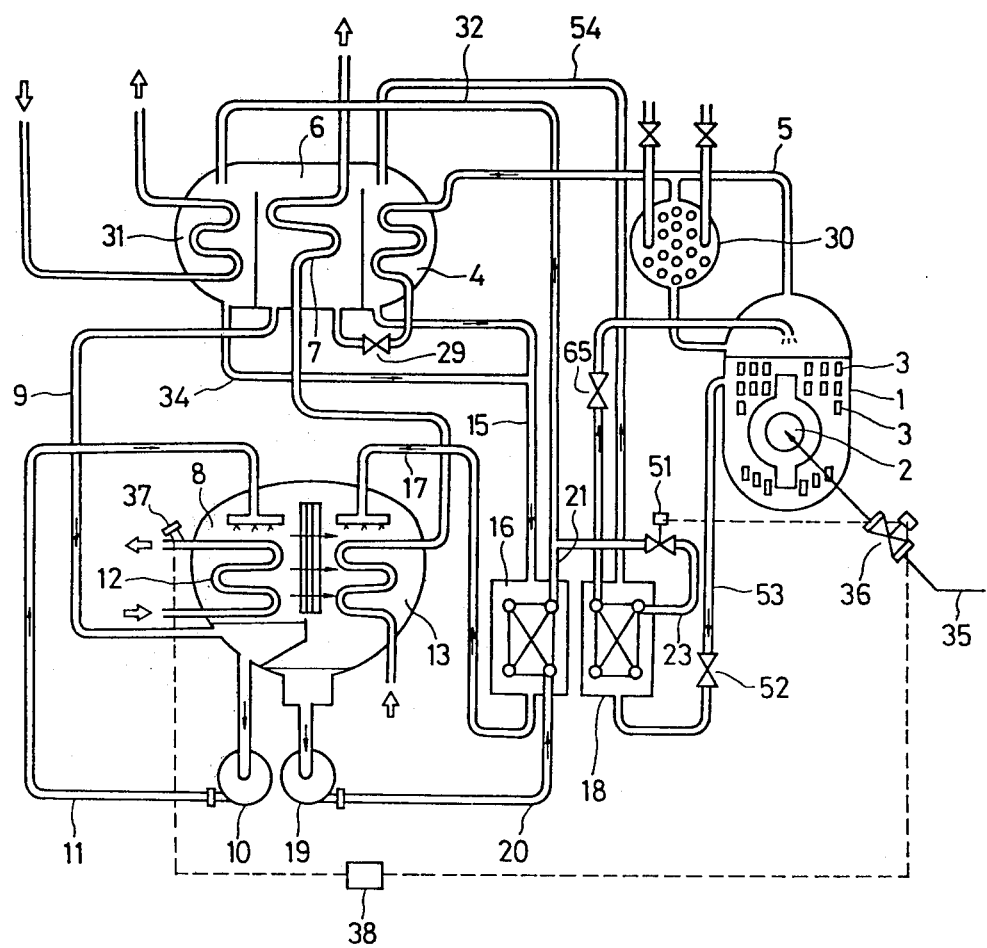

The description will then be made of the third embodiment of the present invention with reference to FIG. 3.

In FIG. 3, like parts are designated by the same numerals used in FIG. 1.

A control valve 51 is disposed at a dilute solution line 21 of a first heat exchanger 16. A medium solution from the high temperature generator 1 is supplied to a first low temperature generator 4 through a medium solution line 53 provided with a cutoff valve 52, a second heat exchanger 18 and a medium solution line 54. In the first low temperature generator 4, thus supplied medium solution is re-heated by the refrigerant vapor transferred from the high temperature generator 1 and the refrigerant is subsequently separated from the medium solution.

The control valve 51 is controlled by a temperature controller 38 in the same manner as done for a fuel control valve 36.

The description will then be made of the third embodiment of the present invention shown in FIG. 3.

(A) Single Effect Operation

When the low temperature heat source is sufficiently provided, such single effect operation is performed.

With the control valve 51, the fuel control valve 36 and cutoff valves 29 and 52 all closed, a refrigerating cycle is formed by the first low temperature generator 4, a condenser 6, an evaporator 8, an absorber 13 and the first heat exchanger 16, whereby cooled water for air-cooling may be provided from water cooling means 12.

(B) Single Effect-Double Effect Combined Operation

When the low temperature heat source is not sufficiently provided, such single effect-double effect combined operation is to be performed.

With the fuel control valve 36, the control valve 51 and cutoff valves 29 and 52 opened, the high temperature heat source is burned in a combustion heating chamber 2. A refrigerating cycle is then formed by a high temperature generator 1, the first low temperature generator 4, the condenser 6, the evaporator 8, the absorber 13, the first heat exchanger 16, and the second heat exchanger 18, whereby cooled water for air-cooling may be obtained from the water cooling means 12 and hot water may be obtained from a heat exchanger 30.

When the temperature of cooled water reaches a predetermined level, the temperature controller 38 causes the fuel control valve 36 and the control valve 51 to be throttled, thereby to control the evaporation of a refrigerant in the evaporator 8 and the generation of a refrigerant in the high temperature generator 1.

When intending to obtain hot water for heating by means of hot water, a refrigerant is circulated between the high temperature generator 1 and the heat exchanger 30 with the cutoff valves 29, 52 and 65 all closed.

As thus discussed hereinbefore, according to the absorption refrigerating system shown in FIG. 3, a dilute solution passed through the first heat exchanger 16 from the absorber 13 is supplied to a second low temperature generator 31 and is also supplied to the high temperature generator 1 through the control valve 51. A medium solution from the high temperature generator 1 is supplied to the first low temperature generator 4.

The dense solutions changed from the dilute solutions with the refrigerants separated in the first low temperature generator 4 and the second low temperature generator 31 join each other and thus joined solution is returned to the absorber 13.

With such arrangement, the supply of a solution and a fuel to the high temperature generator 1 may be controlled dependent on the capacity of the second low temperature generator 31 by the operation of the fuel control valve 36 and control valve 51.

Figure 4:
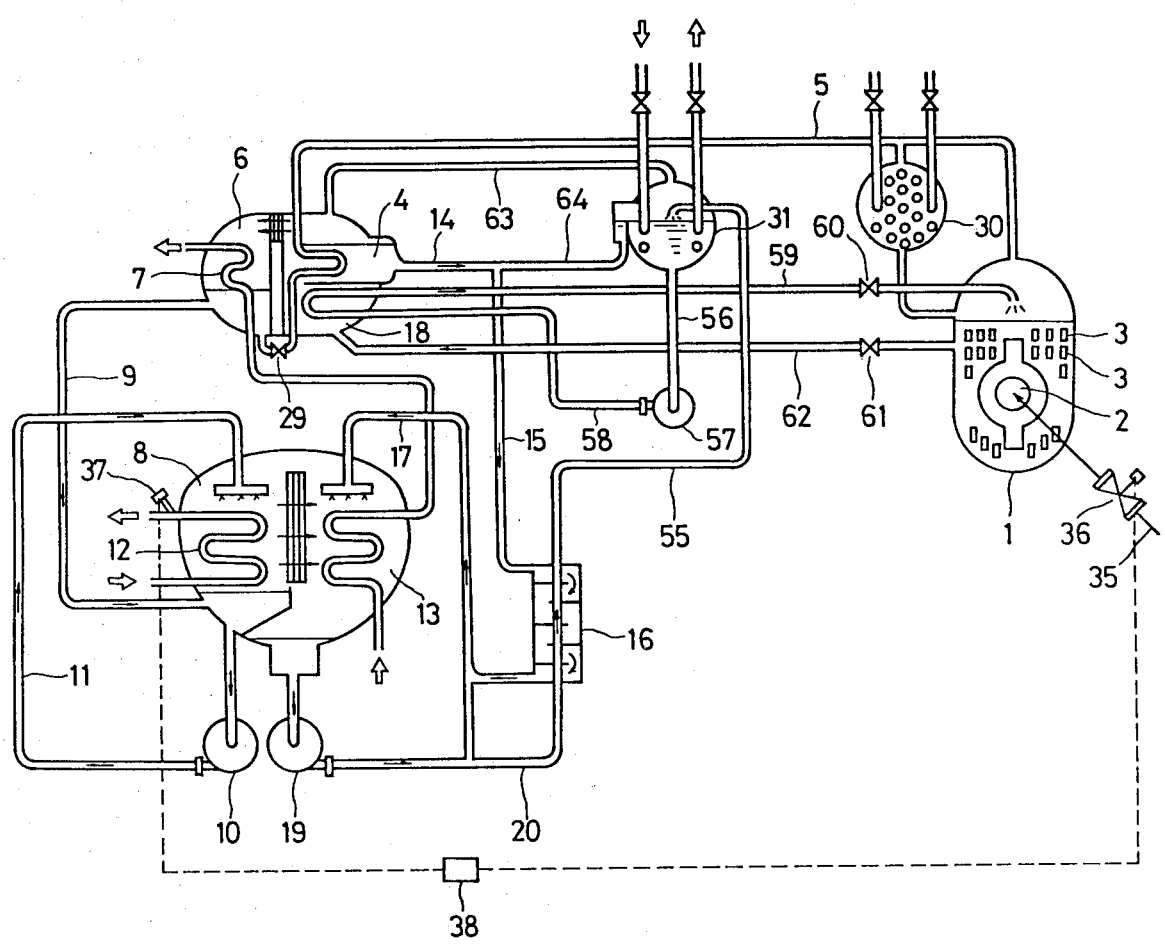

The description will then be made of the forth embodiment of the present invention with reference to FIG. 4.

In FIG. 4, like parts are designated by the same numerals used in FIG. 1.

A dilute solution from a first heat exchanger 16 is supplied to a second low temperature generator 31 through a dilute solution line 55. The bottom of the second low temperature generator 31 is connected to a second heat exchanger 18 through a solution line 56, a solution pump 57 and a solution line 58, and is further connected to a high temperature generator 1 from the second heat exchanger 18 through a solution line 59 and a cutoff valve 60.

A solution from the high temperature generator 1 is supplied to the second heat exchanger 18 through a cutoff valve 61 and a solution line 62.

The upper portion of the second low temperature generator 31 is connected to a condenser 6 by a refrigerant line 63.

Disposed between the second low temperature generator 31 and a dense solution line 15 to the first heat exchanger 16 is a by-pass line 64 for by-passing the high temperature generator 1, the second heat exchanger 18 and the first low temperature generator 4 in a suitable and selective manner.

The description will then be made of the operation of this forth embodiment shown in FIG. 4.

(A) Single Effect Operation

With the solution pump 57 stopped operating, the second low temperature generator 31 is heated by means of the low temperature heat source. The refrigerant separated from a dilute solution will pass through the refrigerant line 63 and then be liquidized in the condenser 6 to enter into an evaporator 8. In this evaporator 8, thus liquidized refrigerant will be evaporated and by evaporation latent heat at this time of evaporation, cooled water for air-cooling is then obtained from water cooling means 12.

Since the solution pump 57 is being stopped operating, the liquid level in the second low temperature generator 31 is raised and a dense solution formed with a refrigerant separated from a dilute solution enters into the by-pass line 64 and is then supplied to and sprayed in an absorber 13 through the dense solution line 15, the first heat exchanger 16 and a dense solution line 17. Thus sprayed dense solution absorbed the evaporated refrigerant, and is changed into a dilute solution. By an absorbent solution pump 19, such dilute solution passes through a dilute solution line 20, the first heat exchanger 16 and the dilute solution line 55 and enters into the second low temperature generator 31. Thereafter, such a cycle will be repeated.

(B) Double Effect Operation

With the solution pump 57 operated, the high temperature heat source is burned in a combination heating chamber 2. Then, a refrigerating cycle is formed by the high temperature generator 1, the first low temperature generator 4, the condenser 6, the evaporator 8, the absorber 13, the first heat exchanger 16 and the second heat exchanger 18, whereby cooled water for air-cooling may be obtained from water cooling means 12 and hot water may be obtained from a heat exchanger 30.

(C) Single Effect-Double Effect Combined Operation

A single effect-double effect combined operation may be performed by heating the second low temperature generator 31 by the low temperature heat source.

The fuel control valve 36 is adjusted by a temperature controller 38 adapted to be operated by a temperature detector 37 for detecting the temperature of the cooled water from the water cooling means 12.

When intending to obtain hot water for heating by means of hot water the cutoff valves 60 and 61 and a cutoff valve 29 at a refrigerant vapor line 5 are closed and a refrigerant is circulated between the high temperature generator 1 and the heat exchanger 30, thereby to obtain hot water from the heat exchanger 30.

As thus discussed hereinbefore, according to the absorption refrigerating system in FIG. 4, the second low temperature generator 31 and a solution pump 57 are disposed at the dilute solution line between the first heat exchanger 16 and the second heat exchanger 18, and the by-pass line 64 for by-passing the first low temperature generator 4 and the high temperature generator 1 is disposed between the second low temperature generator 31 and the dense solution line 15, whereby the operation mode of the absorption refrigerating system may be selected by operating or stopping the solution pump 57.

Thus, the description has been made in detail of the embodiments of the single effect and double effect absorption refrigerating system according to the present invention. Namely, when the low temperature heat source such as waste heat or hot water obtained from a solar heat collecting apparatus is sufficiently provided, a single effect operation is performed, and when such low temperature heat source is not sufficiently provided, a double effect operation using the high temperature heat source such as town gas, kerosene or high temperature vapor is automatically performed to provide a single effect-double effect combined operation. When it is not possible to operate the refrigerating system with the low temperature heat source of which temperature is too low, only a double effect operation may be performed with a single effect operation stopped. Thus, dependent on the low temperature heat source and loads, the operation mode of the absorption refrigerating system of the present invention may be selected, thereby to realize the effective use of energy and a stable switching operation.

What we claim is:

1. In a double effect absorption refrigerating system which includes a high temperature generator heated by a high temperature heat source, a first low temperature generator heated by refrigerant vapor separated from a dilute solution in said high temperature generator, a condenser, an evaporator, an absorber producing a dilute solution, a first heat exchanger and a second heat exchanger interconnected in an air-tight manner through refrigerant lines, dilute solution lines and dense solution lines, the improvement comprising:

a combination single effect and double effect absorption refrigerating system comprising a second low temperature generator which is connected between one of said dilute solution lines and one of said dense solution lines; a low temperature heat source to heat said second low temperature generator; means for delivering said dilute solution directly from said one dilute solution line into said second low temperature generator when a single effect-double effect combined operation is performed; and means for controlling the supply of a solution and a fuel to said high temperature generator in response to the heating capacity of said second low temperature generator.

2. A single effect and double effect absorption refrigerating system as set forth in claim 1, comprising means for delivering said dilute solution to said first low temperature generator, said second low temperature generator and said high temperature generator, respectively, and means for extracting the dense solutions formed with the refrigerants separated from the dilute solutions from said first low temperature generator, said second low temperature generator and said high temperature generator and for combining said dense solutions together in said one dense solution line.

3. A single effect and double effect absorption refrigerating system as set forth in claim 2, comprising means for extracting a dilute solution from said absorber and passing it through said first heat exchanger; means for delivering said extracted dilute solution through said one dilute solution line to said first low temperature generator, to said high temperature generator and to said second low temperature generator; valve means for controlling the delivery of said extracted dilute solution to each of said generators; and means for delivering the solution in said one dense solution line to said absorber through said first heat exchanger.

4. A single effect and double effect absorption refrigerating system as set forth in claim 1, comprising means for selectively delivering the dense solution formed within said second low temperature generator to said first low temperature generator, said high temperature generator and to said absorber; and valve means for selectively interrupting flow of said dense solution to any of said generators.

5. A single effect and double effect absorption refrigerating system as set forth in claim 1, comprising means for extracting said dilute solution from said absorber and for passing it through said first heat exchanger and to said high temperature generator; means for controlling the flow of said dilute solution to said high temperature generator; means for delivering a medium solution from said high temperature generator to said first low temperature generator; and means for combining the dense solutions formed with the refrigerants separated in said first and second low temperature generators, respectively, in said one dense solution line for return to said absorber.

6. A single effect and double effect absorption refrigerating system as set forth in claim 1, comprising a solution pump for moving a resultant solution from said second low temperature generator through said second heat exchanger to said high temperature generator; and means for delivering a solution from said high temperature generator to said first low temperature generator and to the dense solution line.

7. A single effect and double effect absorption refrigerating system as set forth in claim 1, wherein said second low temperature generator comprises means for heating water with solar heat and for circulating the hot water through said generator.

8. A single effect and double effect absorption refrigerating system as set forth in claim 6, wherein a by-pass line for by-passing said high temperature generator and said first low temperature generator is disposed between said second low temperature generator and said one dense solution line.

9. The system of claim 4 in which said delivering means comprises a solution pump and said valve means comprises a plurality of cutoff valves.

* * * * *